(12) United States Patent
Luan et al.

(10) Patent No.: US 9,394,179 B2
(45) Date of Patent: Jul. 19, 2016

(54) METHOD OF MAKING MODIFIED ACTIVATED CARBON

(75) Inventors: Zhaohua Luan, Midlothian, VA (US); Diane L. Gee, Richmond, VA (US); Georgios Karles, Richmond, VA (US); Ila Skinner, Chester, VA (US); Jose Nepomuceno, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 2143 days.

(21) Appl. No.: 11/727,712

(22) Filed: Mar. 28, 2007

(65) Prior Publication Data
US 2007/0259124 A1 Nov. 8, 2007

Related U.S. Application Data

(60) Provisional application No. 60/787,498, filed on Mar. 31, 2006.

(51) Int. Cl.
  *C01B 31/00* (2006.01)
  *C01B 31/08* (2006.01)
  *A24D 3/16* (2006.01)

(52) U.S. Cl.
  CPC .............. *C01B 31/084* (2013.01); *A24D 3/163* (2013.01); *Y10T 428/30* (2015.01)

(58) Field of Classification Search
  USPC ........................................................ 427/227
  See application file for complete search history.

(56) References Cited

U.S. PATENT DOCUMENTS

| | | | |
|---|---|---|---|
| 3,961,025 A * | 6/1976 | Harendza-Harinxma | 423/415.1 |
| 3,972,335 A | 8/1976 | Tiggelbeck et al. | |
| 4,553,191 A * | 11/1985 | Franks et al. | 361/212 |
| 4,827,950 A | 5/1989 | Banerjee et al. | |
| 5,037,791 A | 8/1991 | Comolli et al. | |
| 5,137,034 A | 8/1992 | Perfetti et al. | |
| 5,271,419 A | 12/1993 | Arzonico et al. | |

(Continued)

FOREIGN PATENT DOCUMENTS

| GB | 247241 A | 2/1926 |
|---|---|---|
| GB | 244461 A | 1/1927 |

(Continued)

OTHER PUBLICATIONS

Machine Translation of JP 2001-031413.*

(Continued)

*Primary Examiner* — Robert Vetere
(74) *Attorney, Agent, or Firm* — Buchanan Ingersoll & Rooney PC

(57) ABSTRACT

A process for making modified activated carbon from an activated carbon substrate. The activated carbon substrate is pre-treated to make an exposed surface of the activated carbon substrate substantially hydrophilic, coated with a carbon precursor to form a coated activated carbon, and then the coated activated carbon substrate is heated to carbonize the carbon precursor to from the modified activated carbon. The modified activated carbon comprises a uniform porous carbon membrane formed on an exposed surface of the activated carbon substrate. The carbon membrane can mediate the absorption and/or adsorption kinetics of the activated carbon substrate. The modified activated carbon, which can be incorporated into one or more components of a cigarette, can selectively remove gaseous constituents from mainstream smoke during smoking.

16 Claims, 7 Drawing Sheets

(56) References Cited

U.S. PATENT DOCUMENTS

| | | | |
|---|---|---|---|
| 5,277,828 A * | 1/1994 | Fleming | 210/792 |
| 5,360,023 A | 11/1994 | Blakley et al. | |
| 5,403,809 A | 4/1995 | Miller et al. | |
| 5,488,023 A | 1/1996 | Gadkaree et al. | |
| 5,597,617 A | 1/1997 | DeLiso et al. | |
| 5,658,372 A | 8/1997 | Gadkaree | |
| 5,692,525 A | 12/1997 | Counts et al. | |
| 5,750,026 A | 5/1998 | Gadkaree et al. | |
| 5,998,328 A | 12/1999 | Dawes et al. | |
| 6,187,713 B1 | 2/2001 | Gadkaree | |
| 6,372,289 B1 | 4/2002 | Hickman | |
| 6,515,845 B1 * | 2/2003 | Oh et al. | 361/502 |
| 6,584,979 B2 | 7/2003 | Xue et al. | |
| 2002/0008956 A1 | 1/2002 | Niu | |
| 2002/0064495 A1 * | 5/2002 | Miura | C01B 31/10 423/445 R |
| 2002/0150686 A1 | 10/2002 | Mitchell et al. | |
| 2003/0003289 A1 | 1/2003 | Py et al. | |
| 2004/0202602 A1 * | 10/2004 | Masa-aki et al. | 423/445 R |
| 2005/0133047 A1 | 6/2005 | Fournier et al. | |
| 2005/0196820 A1 * | 9/2005 | Zweig | G01N 33/5438 435/14 |

FOREIGN PATENT DOCUMENTS

| | | | |
|---|---|---|---|
| JP | H05237326 A | | 9/1993 |
| JP | H07215711 A | | 8/1995 |
| JP | H0826710 A | | 1/1996 |
| JP | 2000-219507 | * | 8/2000 |
| JP | 2000219507 A | | 8/2000 |
| JP | 2001-031413 | * | 2/2001 |
| JP | 2001031413 A | | 2/2001 |
| JP | 2005518204 A | | 6/2005 |
| WO | WO2004/043859 A | | 5/2004 |
| WO | WO2006/070291 A | | 7/2006 |

OTHER PUBLICATIONS

Database WPI Week 200060 Derwent XP 002461747.*
International Preliminary Report on Patentability dated Oct. 9, 2008 for PCT/IB2007/002120.
Derwent Publications Ltd., London, GB, AN 2000-621477 and JP2000219507A, Nippon 'Carbon Co. Ltd., Aug. 8, 2000, Abstracts Only.
International Search Report and Written Opinion dated Dec. 20, 2007 for PCT/IB2007/002120.

* cited by examiner

METHOD OF MAKING MODIFIED ACTIVATED CARBON

CROSS REFERENCE TO RELATED APPLICATION

This application claims priority under 35 U.S.C. §119(e) to U.S. provisional Application No. 60/787,498, filed on Mar. 31, 2006, the entire content of which is incorporated herein by reference.

BACKGROUND

Conventional cigarettes have filter elements that may incorporate materials such as carbon. Certain commercially available filter cigarettes have particles or granules of carbon (e.g., an activated carbon material or an activated charcoal material) incorporated with the cellulose acetate tow or in cavities between cellulose acetate material. However many materials, including activated carbon, that mechanically, chemically and/or physically remove constituents from mainstream cigarette smoke are typically non-selective. These materials can remove constituents that contribute flavor to mainstream smoke and, as a result, can impart poor taste and/or off-taste during the smoking of a cigarette. Accordingly, it would be desirable to provide a cigarette filter element that is capable of removing certain gas phase constituents of mainstream cigarette smoke while not adversely affecting the flavor of the mainstream smoke.

SUMMARY

According to one embodiment, a process for making modified activated carbon comprises an activated carbon substrate and a uniform, porous carbon membrane formed on an exposed surface of the activated carbon substrate, the process comprising: (i) providing an activated carbon substrate; (ii) pre-treating the activated carbon substrate to make an exposed surface of the activated carbon substrate substantially hydrophilic; (iii) coating the activated carbon substrate with a carbon precursor to form a coated activated carbon substrate; and (iv) heating the coated activated carbon substrate at a temperature sufficient to carbonize the carbon precursor to form the uniform, porous carbon membrane.

The modified activated carbon made according to the process comprises the activated carbon substrate and a uniform, porous carbon membrane formed on an exposed surface of the activated carbon substrate. The activated carbon substrate can be in the form of beads, granules, or fibers. Multiple coatings of carbon precursor can be applied and carbonized to control the thickness and/or surface porosity of the carbon membrane.

The activated carbon substrate can comprise particles of activated carbon, which can have an average particle size of from about 100 microns to 5 mm or from about 200 microns to 2 mm. Preferably, the activated carbon substrate has an average pore size of less than about 500 Angstroms, or a pore size distribution comprising greater than about 20% micropores (and fewer than about 80% mesopores), more preferably greater than about 80% micropores. The surface area of the activated carbon substrate can be greater than 50 $m^2/g$ (e.g., greater than 200, 500 or 1000 $m^2/g$).

The pre-treating preferably comprises spraying the activated carbon substrate with and/or immersing the activated carbon substrate in an aqueous solution comprising a surfactant. A preferred surfactant is cetyltrimethylammonium chloride and a preferred pre-treatment solution comprises from about 1 to 99 wt. % surfactant, more preferably from about 1 to 25 wt. % surfactant.

After incorporating the surfactant in and/or on the activated carbon substrate, the activated carbon substrate can be dried preferably at a temperature of less than about 120° C. prior to coating with a carbon precursor.

The coating preferably comprises spraying the pre-treated activated carbon substrate with and/or immersing the pre-treated activated carbon substrate in a solution comprising the carbon precursor. The coating can be done at room temperature. Suitable carbon precursors include saccharides, disaccharides, polysaccharides, fructose and ethyl cellulose, and a preferred carbon precursor solution comprises from about 1 to 99 wt. %, more preferably between about 20 and 60 wt. % carbon precursor. A preferred carbon precursor is sucrose.

The carbon precursor can be incorporated in an amount to give from about 1 to 150% by weight, preferably from about 20 to 80% by weight, of the carbon precursor in and/or on the pre-treated activated carbon substrate.

After coating the activated carbon substrate, the coated substrate can be dried at a temperature of less than about 120° C. and then heated, preferably at a temperature of from about 150° C. to 400° C., to form the carbon membrane. The coated substrate is preferably heated in an oxidizing atmosphere (e.g., in air). After converting the carbon precursor to the carbon membrane, the carbon membrane can comprise from about 1 to 150% by weight of the activated carbon substrate. The average pore size at the surface of the modified activated carbon (i.e., the pore size of the carbon membrane) can be different than the average pore size at the surface of the activated carbon substrate. Preferably, the modified activated carbon has an average surface pore size that is at least 25% less than the average surface pore size of the activated carbon substrate.

The carbon membrane forms a uniform porous coating on the activated carbon substrate and preferably covers at least 80% of the exposed surface of the activated carbon substrate and/or the carbon membrane has an average thickness having a standard deviation that is less than about 25% of the average thickness. Preferably, the carbon membrane has an average thickness of from about 1 micron to 0.1 mm. By providing a uniform porous carbon coating on the activated carbon substrate, the filtration characteristics and/or mechanical integrity of the modified activated carbon can be improved with respect to the activated carbon substrate. For example, the modified activated carbon may selectively remove targeted gas phase constituents from mainstream cigarette smoke while advantageously producing less dust than the activated carbon.

According to another embodiment, a cigarette comprises modified activated carbon particles. The modified activated carbon particles are preferably incorporated in the filter element of the cigarette. However, the modified activated carbon particles can be located in other components of the cigarette, such as in the tobacco cut filler.

DETAILED DESCRIPTION OF PREFERRED EMBODIMENTS

Figure 1:
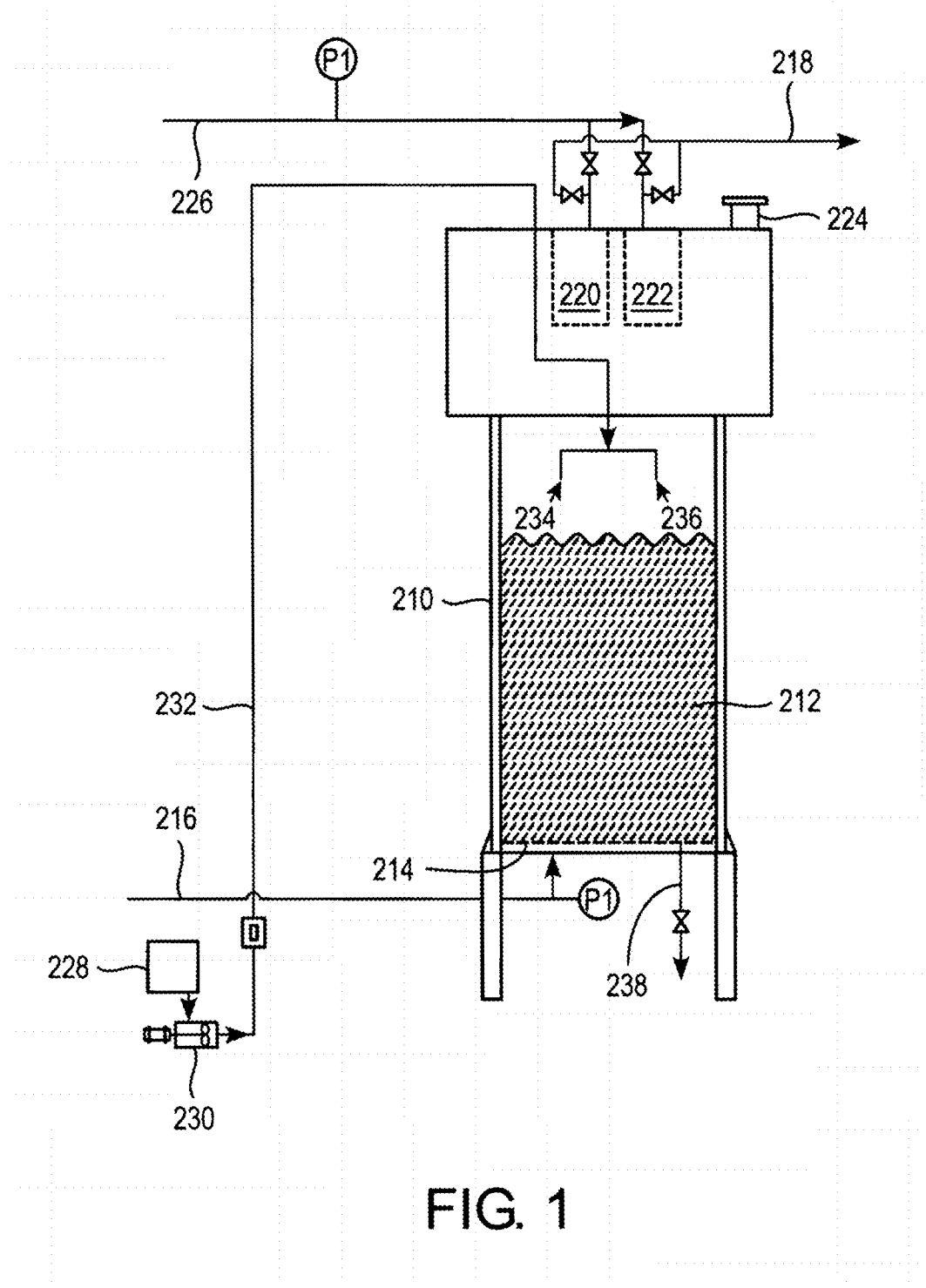
FIG. 1 is a diagram of a batch type fluidizing bed apparatus, which can be used to treat activated carbon particles with a carbon precursor.

In one embodiment, a process is provided for making modified activated carbon. The modified activated carbon comprises a uniform porous carbon membrane on an activated carbon substrate. The process comprises (i) providing an activated carbon substrate; (ii) pre-treating the activated carbon substrate to make an exposed surface of the activated carbon substrate substantially hydrophilic; (iii) coating the activated carbon substrate with a carbon precursor to form a coated activated carbon substrate; and (iv) heating the coated activated carbon substrate at a temperature sufficient to carbonize the carbon precursor to form the uniform porous carbon membrane. The steps of coating the activated carbon substrate with a carbon precursor and heating the coated activated carbon substrate to form the carbon membrane can be repeated to form a carbon membrane having the desired thickness, surface coverage and/or surface porosity.

Solutions comprising a compound used for the pre-treatment and/or solutions comprising the carbon precursor can be applied to the activated carbon substrate (e.g., particles of activated carbon) by spraying the carbon with a solution or by immersing the carbon in a solution. The pre-treatment compound and/or the carbon precursor can be incorporated in and/or on the activated carbon substrate via absorption and/or adsorption.

According to a preferred method, an activated carbon substrate in the form of beads, granules or fibers can be introduced into a vessel, fluidized by introducing a fluidizing gas into the vessel, and the pre-treating or the coating can be carried out by introducing a solution of at least one pre-treatment compound or at least one carbon precursor into the vessel while the activated carbon substrate is in a fluidized state. Solutions of the pre-treatment compound and/or carbon precursor can also be incorporated in and/or on the activated carbon substrate using the incipient wetness technique wherein the activated carbon substrate is immersed in the solution for a specified period of time and then dried.

The steps of pre-treating, coating and heating produce an activated carbon that is coated with a uniform layer of porous carbon (i.e., modified activated carbon). The absorptive characteristics, adsorptive characteristics and/or mechanical properties of the modified activated carbon can be controlled by controlling the formation of the carbon coating. For example, the porosity of the carbon coating can control the kinetics of absorption/adsorption by the activated carbon substrate. The carbon membrane can reduce the amount of dust formed from the activated carbon substrate during processing (e.g., during incorporation of the modified activated carbon into one or more components of a cigarette), during cigarette storage and/or during smoking. Also provided are cigarette filters and cigarettes having the modified activated carbon incorporated therein.

By "activated carbon" is meant any porous, high surface area form of carbon. Activated carbon can be derived via thermal treatment of any suitable carbon source. The activation treatment typically increases the porosity and activated carbon can be provided with a wide range of pore sizes or the pore sizes can be controlled to provide a desired pore size distribution.

In a preferred embodiment, the activated carbon comprises granulated carbon particles ranging in size from about 100 microns to 5 mm. For example, the carbon particles can be carbon pellets having sizes of about 0.2 to 2 mm (e.g., about 200, 500, 1000 or 2000 microns).

The activated carbon substrate can have any desired pore size distribution that comprises pores such as micropores, mesopores and macropores. The term "microporous" generally refers to such materials having pore sizes of about 20 Angstroms or less while the term "mesoporous" generally refers to such materials with pore sizes of about 20-500 Angstroms. A preferred activated carbon substrate comprises 20% or more micropores (i.e., 80% or less mesopores). A more preferred activated carbon substrate comprises at least 80% micropores. By depositing a carbon precursor and forming a carbon membrane on an exposed (e.g., external) surface of the activated carbon, the relative ratio of micropores, mesopores and macropores can be controlled in order to control the absorptive and/or adsorptive selectivity of the modified activated carbon with respect to selected gaseous constituents (e.g., gaseous constituents in a tobacco smoke stream).

The modified activated carbon can filter one or more selected constituents from mainstream smoke. The term "mainstream" smoke includes the mixture of gases passing down the tobacco rod and issuing through the filter end, i.e., the amount of smoke issuing or drawn from the mouth end of a smoking article during smoking of the smoking article. The mainstream smoke contains smoke that is drawn in through both the lit region of the smoking article, as well as through the paper wrapper.

The activated carbon can be selected to have an appropriate surface area to preferentially adsorb selected constituents from cigarette smoke. Activated carbon typically has a surface area greater than about 50 m$^2$/g (e.g., at least about 100, 200, 500, 1000 or 2000 m$^2$/g). Typically, the absorptive capacity of activated carbon increases with increasing surface area. Furthermore, surface area increases with decreasing particle size. When used as cigarette filter material, however, activated carbon particles having a small particle size may pack together too densely to permit mainstream smoke to flow through the filter with desired resistance to draw (RTD) during smoking. On the other hand, if the particle size is too large there may be insufficient surface area to accomplish the desired degree of filtration. Therefore, such factors can be taken into account in selecting an activated carbon having a particular particle size.

A particularly preferred activated carbon is commercially available (e.g., from PICA USA, Inc., Truth or Consequences, N. Mex.). The activated carbon could also be manufactured via the carbonization of coconut husk, coal, wood, pitch, peat, cellulose fibers, lignite and olive pits. Carbonization is usually carried out at elevated temperatures, e.g., 400-1000° C. in an inert atmosphere, followed by activation (i.e., calcining) typically in an atmosphere of steam or carbon dioxide. The activated carbon substrate can be in the form of beads, granules and/or fibers.

The pre-treatment can modify an exposed surface of the activated carbon. During the pre-treatment, a compound in solution is absorbed and/or adsorbed by the activated carbon, e.g., the pre-treatment compound can be incorporated on the exterior and/or interior surfaces of the activated carbon. The pre-treatment compound, which is used to render the exposed surface(s) of the activated carbon substantially hydrophilic, is preferably a surfactant (i.e., amphiphilic compound).

Surfactants are typically organic compounds that contain both a hydrophobic moiety and a hydrophilic moiety. The surfactant can be an anionic, an amphoteric, a zwitterionic, a nonionic, or a cationic surfactant, or combinations thereof. A preferred pre-treatment compound is cetyltrimethylammonium chloride. For example a 10 wt. % solution of cetyltrimethylammonium chloride in water can be incorporated onto the activated carbon by immersing the activated carbon in the solution.

The surfactant can be an anionic compound. Suitable anionic compounds include but are not limited to alkyl sulfates, alkyl ether sulfates, alkyl or alkaryl sulfonates, alkyl succinates, alkyl sulfosuccinates, alkyl phosphates, alkyl ether phosphates, alkyl ether carboxylates, alkylamino acids, alkyl peptides, carboxylic acids, acyl and alkyl glutamates, alkyl isethionates, and alpha-olefin sulfonates, especially their sodium, potassium, magnesium, ammonium and mono-, di- and triethanolamine salts. The alkyl groups generally contain from 8 to 18 carbon atoms and may be saturated or unsaturated. The alkyl ether sulfates, alkyl ether phosphates and alkyl ether carboxylates may contain from 1 to 10 ethylene oxide or propylene oxide units per molecule, and preferably contain 1 to 3 ethylene oxide units per molecule.

Examples of suitable anionic surfactants include sodium and ammonium lauryl ether sulfate (with 1, 2, and 3 moles of ethylene oxide), sodium, ammonium, and triethanolamine lauryl sulfate, disodium laureth sulfosuccinate, sodium cocoyl isethionate, sodium C12-14 olefin sulfonate, sodium laureth-6 carboxylate, sodium C12-15 pareth sulfate, sodium methyl cocoyl taurate, sodium dodecylbenzene sulfonate, sodium cocoyl sarcosinate, triethanolamine monolauryl phosphate, and fatty acid soaps.

Nonionic surfactants can include but are not limited to aliphatic ($C_6$-$C_{18}$) primary or secondary linear or branched chain acids, alcohols or phenols, alkyl ethoxylates, alkyl phenol alkoxylates (especially ethoxylates and mixed ethoxy/propoxy), block alkylene oxide condensates of alkyl phenols, alkylene oxide condensates of alkanols, ethylene oxide/propylene oxide block copolymers, semi-polar nonionics (e.g., amine oxides and phospine oxides), as well as alkyl amine oxides. Other suitable nonionics include mono- or di-alkyl alkanolamides and alkyl polysaccharides, sorbitan fatty acid esters, polyoxyethylene sorbitan fatty acid esters, polyoxyethylene sorbitol esters, polyoxyethylene acids, and polyoxyethylene alcohols. Examples of suitable nonionic surfactants include coco-mono- or di-ethanolamide, coco-di-glucoside, alkyl polyglucoside, polysorbate 20, ethoxylated linear alcohols, cetearyl alcohol, lanolin alcohol, stearic acid, glyceryl stearate, PEG-100 stearate, and oleth 20.

The surfactant can be an amphoteric or zwitterionic surfactant. Amphoteric and zwitterionic surfactants are those compounds which have the capacity of behaving either as an acid or a base. Examples of amphoteric surfactants include $C_8$ to $C_{18}$ sultaines such as coco-sultaine and cocoamidopropyl hydroxysultaine; $C_8$ to $C_{18}$ fatty derivatives of amino acids such as cocoamphocarboxyglycinate and lauramphoglycinate; $C_8$ to $C_{18}$ alkyl betaines such as decyl betaine, cocobetaine, lauryl betaine, myristyl betaine and stearyl betaine; and $C_8$ to $C_{18}$ amidoalkyl betaines such as cocoamidoethyl betaine, cocoamidopropyl betaine, lauramidopropyl betaine, myristamidopropyl betaine and oleamidopropyl betaine The surfactant can be a cationic surfactant. Suitable cationic surfactants include but are not limited to alkyl amines, alkyl imidazolines, ethoxylated amines, quaternary compounds, and quaternized esters. In addition, alkyl amine oxides can behave as a cationic surfactant at a low pH. Examples include lauramine oxide, dicetyldimonium chloride and cetrimonium chloride.

An aqueous or other solvent solution of the pre-treatment compound can be sprayed onto the activated carbon, or the activated carbon may be immersed in the solution. "Aqueous" as used herein refers to mixtures (e.g., solutions and emulsions) that comprise water as a component. An aqueous mixture can also include organic solvents, which are either miscible or immiscible with water. The concentration of the pre-treatment compound in the solvent can be from about 1 to 99 wt. %. A preferred solution of the pre-treatment compound comprises from about 1 to 25 wt. %, more preferably from about 1 to 10 wt. %, of the pre-treatment compound in a suitable solvent. Suitable solvents include propylene glycol, alcohols (e.g., methyl alcohol, ethyl alcohol, etc.), water, glycerin and mixtures thereof. A preferred solvent for the pre-treatment compound is water. After coating the activated carbon substrate with a solution of the pre-treatment compound, the pre-treated activated carbon substrate can be air dried and/or dried in an oven at low temperature (e.g., less than about 120° C., preferably about 100° C.) to form pre-treated activated carbon. The pre-treatment compound is preferably incorporated over an exposed surface of the activated carbon substrate and, after drying, results in an activated carbon substrate having a surface (i.e., an exposed surface on the interior and exterior of the activated carbon substrate) that is substantially hydrophilic.

A solution comprising the carbon precursor can be incorporated in and/or on the pre-treated activated carbon substrate. As described below, an aqueous or other solvent solution of the carbon precursor can be sprayed onto the pre-treated activated carbon, or the pre-treated activated carbon may be immersed in the carbon precursor solution. The carbon precursors are preferably organic compositions. Particularly preferred carbon precursors are saccharides, for example pentose and hexose; monosaccharides such as glucose; and disaccharides, especially sucrose. Additional carbon precursors include polysaccharides, fructose and ethyl cellulose.

A solution comprising the carbon precursor compound used in making the modified activated carbon may be absorbed and/or adsorbed by the pre-treated activated carbon, e.g., the carbon precursor compound can be incorporated on the exterior and/or interior surfaces of the activated carbon substrate. By providing a pre-treated activated carbon substrate, an aqueous solution of a carbon precursor can form a uniform coating of the carbon precursor on the activated carbon substrate.

Preferably, the carbon precursor compound does not substantially penetrate into the pores of the activated carbon substrate. Rather, the carbon precursor compound preferably forms a uniform coating over the exposed surface of the activated carbon which, upon decomposition of the carbon precursor, forms a uniform porous carbon coating capable of mediating absorption and/or adsorption by the activated carbon substrate.

The carbon precursor can be incorporated in and/or on the activated carbon particles using a fluidized bed or, alternatively, the carbon precursor can be sprayed onto the activated carbon, or the activated carbon can be immersed in a solution comprising the carbon precursor.

The carbon precursor is preferably added in amounts of about 1 to 150%, preferably at least about 10% (e.g., at least 20, 40, 60 or 80%±5% by weight) of the original weight of the activated carbon. Prior to carbonizing the carbon precursor, the carbon precursor coating substantially covers the activated carbon substrate (i.e., the carbon precursor coating substantially blocks all of the surface porosity of the activated carbon).

The activated carbon substrate and the carbon precursor solution are preferably mixed at about room temperature, though suitable temperatures range from about 0° C. to 80° C. After the carbon precursor solution is incorporated in and/or on the activated carbon substrate, the coated activated carbon is dried at about 80 to 120° C., preferably at about 100° C., and then heated at a temperature of about 150 to 400° C. for a period of from about 1 minute to 72 hours in order to carbonize the carbon precursor and form the modified activated carbon. Carbonization of the carbon precursor coating can create a porous carbon coating. Preferably the carbon coating formed from the carbon precursor will have an average surface pore size that is different than, more preferably less than, the average surface pore size of the activated carbon substrate. For example, the average surface pore size of the modified activated carbon can be at least 10, 15, 20 or 25% less than the average surface pore size of the activated carbon substrate. In a preferred embodiment, the carbon membrane of the modified activated carbon has an average pore size that is at least 25% less than the average surface pore size of the activated carbon substrate. By changing the surface porosity of the activated carbon substrate, the absorption and/or adsorption kinetics of the activated carbon can be changed.

For large quantities, the modified activated carbon can be made by the following process, wherein a fluidizing bed is used to apply at least one of the pre-treatment compound and the carbon precursor onto the activated carbon substrate (e.g., particles of activated carbon). In the process, activated carbon particles are introduced into a vessel. In order to fluidize the particles, a gas such as nitrogen is introduced into the bottom of the vessel. A solution of the pre-treatment compound or carbon precursor is then introduced into the vessel while the carbon particles are in a fluidized state. Preferably, these materials are incorporated onto an exposed surface of the activated carbon substrate while maintaining the particles at ambient temperature, i.e., the process is carried out without heating the particles. Although the materials are preferably applied to the upper surface of the fluidized bed, the agitation of the carbon particles distributes the materials throughout the bed of carbon particles.

In the fluidizing treatment, an inert gas such as nitrogen is used to fluidize the activated carbon particles. The flow rate of the fluidizing gas will depend on the size of the fluidized bed. In a preferred embodiment, the flow rate is at least 5 ft$^3$/minute, more preferably 10 to 20 ft$^3$/minute. The flow rate of the carbon precursor onto the carbon particles will depend on the amount of carbon being treated and/or the duration of the fluidized bed treatment. In a preferred embodiment, the carbon precursor is applied as a liquid at a flow rate of at least 10 g/minute, e.g., 15 to 25 g/minute for a batch of 25 pounds of activated carbon. The carbon precursor can be dissolved or suspended in a carrier such as propylene glycol, alcohols (e.g., methyl alcohol, ethyl alcohol, etc.), water, glycerin and mixtures thereof, e.g., an aqueous solution containing the carbon precursor and water. The concentration of carbon precursor in the carrier can be from about 1 to 99% by weight. A preferred concentration of carbon precursor is from about 20 to 60% by weight. After the carbon precursor is applied to the carbon in the fluidized bed, the fluidizing action can be continued to promote thorough distribution of the precursor in the fluidized bed. As an example, the carbon precursor can be applied to activated carbon particles for a period of 15 minutes and the fluidizing action can be continued for an additional 5 minutes thereafter. While not wishing to be bound by theory, it is believed that the fluidizing gas is effective in causing the carbon precursor to be distributed uniformly over the carbon particles via mass transfer and/or particle collisions.

Figure 2:
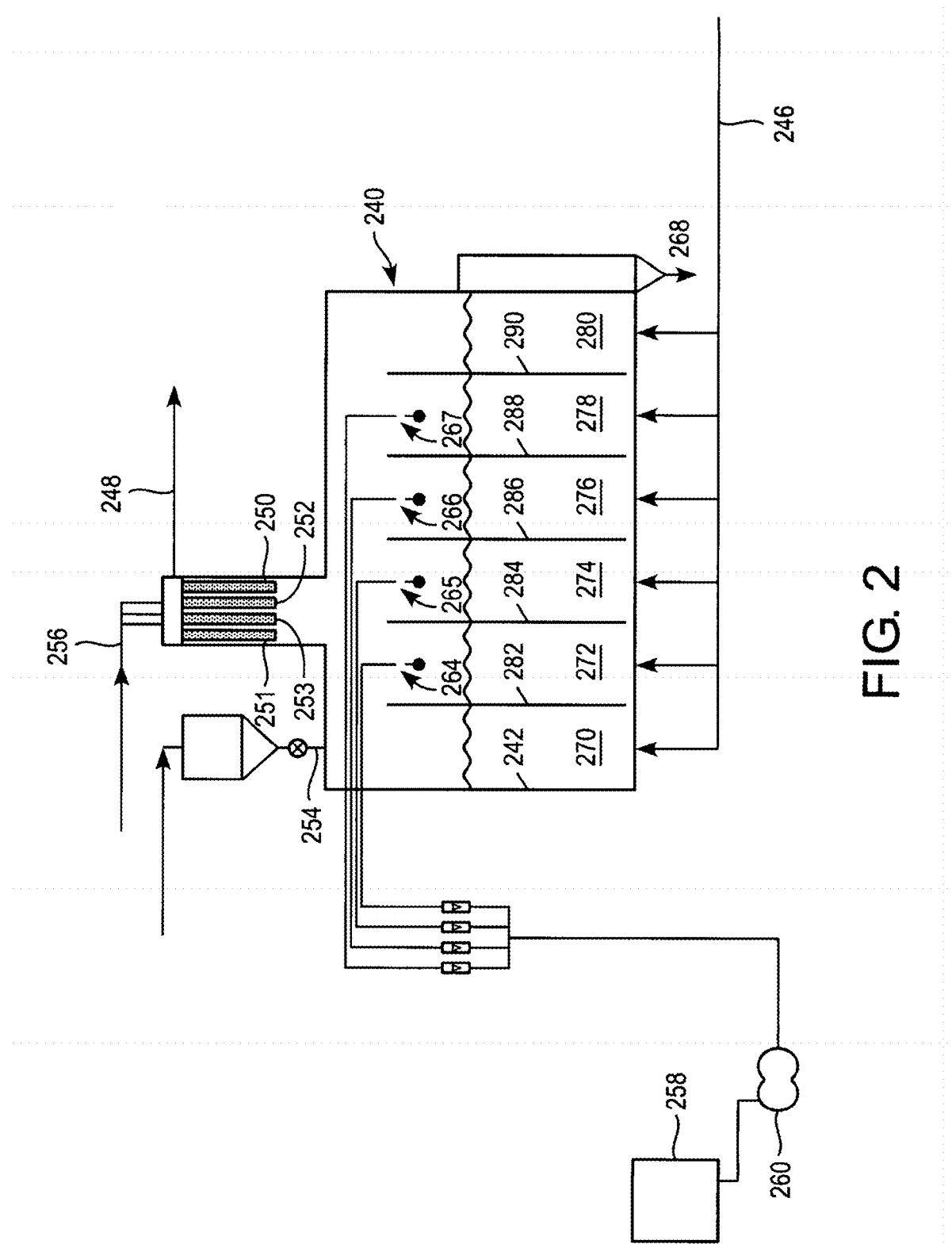
FIG. 2 is a diagram of a continuous type fluidizing bed apparatus, which can be used to treat activated carbon particles with a carbon precursor.

Any suitable vessel that is capable of maintaining the activated carbon particles in a fluidized state may be used. Such vessels can be designed as batch or continuous processing apparatus. An exemplary batch type fluidized bed arrangement is shown in FIG. 1 and an exemplary continuous type fluidized bed arrangement is shown in FIG. 2. A highly advantageous feature of the fluidized bed technique of applying the carbon precursor to the pre-treated activated carbon substrate is that a uniform coating of the carbon precursor can be obtained on the activated carbon substrate. In the description that follows, incorporation of the carbon precursor in and/or on the activated carbon is described using a fluidized bed. A fluidized bed arrangement can also be used to incorporate a solution of the pre-treatment compound in and/or on the activated carbon.

In the FIG. 1 arrangement, a vessel 210 is loaded with activated carbon 212 and a fluidizing gas flows upwardly through openings in a distribution plate 214. The gas preferably comprises an inert gas such as nitrogen supplied through supply line 216. After passing through the bed of carbon particles, the fluidizing gas passes through filters 220, 222 and is removed from the vessel through exhaust line 218. The carbon particles can be supplied into the vessel 210 through feed port 224. To clean off accumulated material such as fine carbon particles, a clearing gas such as nitrogen can be blown back through the filters 220, 222 via supply line 226. A series of valves can be used to isolate the exhaust line 218 from the supply line 226 whereby nitrogen is prevented from flowing into supply line 226 when gasses are withdrawn through exhaust line 218. Likewise, the valves can isolate the exhaust line 218 from the blow back gas supplied by supply line 226 during cleaning of the filters 220, 222. The filter cleaning can be conducted during treatment of the carbon, e.g., nitrogen blow back can be carried out periodically while the activated carbon is in a fluidized state. As an example, if the carbon is treated for 15 minutes, the nitrogen blow back can be carried out in 2 second pulses every 60 seconds during the carbon treatment. A solution of the carbon precursor in tank 228 can be removed by a pump 230 which sends the precursor through supply line 232 and into the vessel after passing through nozzles 234, 236. The pretreated and coated activated carbon particles can be removed from the vessel through a discharge line 238.

In the FIG. 2 arrangement, a compartmented vessel 240 is loaded with activated carbon 242 and a fluidizing gas flows upwardly through openings in a distribution plate (not shown). The gas preferably comprises nitrogen supplied through supply line 246. After passing through the bed of carbon particles, the fluidizing gas passes through filters 250, 251, 252, 253 and is removed from the vessel through exhaust line 248. The carbon particles can be supplied into the vessel 240 through feed line 254.

To clean off accumulated material such as fine carbon particles, a clearing gas such as nitrogen can be blown back through the filters 250, 252 via supply line 256. A series of valves can be used to isolate the exhaust line 248 from the supply line 256 whereby nitrogen is prevented from flowing into supply line 256 when gasses are withdrawn through exhaust line 248. Likewise, the valves can isolate the exhaust line 248 from the blow back gas supplied by supply line 256 during cleaning of the filters 250-253. The filter cleaning can be conducted during treatment of the carbon, e.g., nitrogen blow back can be carried out periodically while the carbon is in a fluidized state. As an example, if the carbon is treated for 15 minutes, the nitrogen blow back can be carried out in 2 second pulses every 60 seconds during the carbon treatment.

A carbon precursor solution in tank 258 can be removed by a pump 260 which sends the precursor solution through supply line 262 and into the vessel after passing through nozzles 264, 265, 266, 267. The coated activated carbon can be removed from the vessel through a discharge line 268. The vessel 240 can have any desired number of compartments, e.g., in the embodiment shown the vessel includes six compartments 270, 272, 274, 276, 278, 280 separated by partitions 282, 284, 286, 288, 290. The carbon precursor can be supplied only to the middle compartments 272, 274, 276, 278 whereby the first compartment 270 can be used as a loading compartment and the last compartment 280 can be used as a discharge compartment.

Passage of carbon particles from one compartment to the next is achieved by providing one or more openings in the partitions 282, 284, 286, 288, 290. For example, a single opening can be provided at the bottom of each partition, e.g., a rectangular opening of 1-2 inches by 2-4 inches. To prevent the carbon particles from flowing directly from one compartment to the next, it is advantageous to offset the openings, e.g., the first partition 282 can have an opening near one side of the vessel and the next partition 284 can have an opening near the opposite side of the vessel and so on to provide a tortuous path of travel of the carbon through the vessel.

The fluidized bed of carbon particles behaves like a liquid with a portion of the fluidized particles being driven upwardly by the fluidizing gas with some of the particles being transferred from the first compartment 270 into the second compartment 272 by flowing through an opening (e.g., 1 by 2 inch opening) between the compartments 270, 272 at the bottom of the partition 282. In like manner, the particles move from compartment to compartment until they reach the discharge compartment. Thus, the particles move from compartment to compartment while in a fluidized state and ultimately are removed from the vessel after a predetermined residence time. The residence time can vary depending on the size of the vessel and number of compartments. The residence time can range from 5 to 60 minutes, more preferably 10 to 20 minutes.

The sizes of the compartments of the vessel are preferably the same and the carbon precursor can be distributed in the middle compartments by two or more outlets in each compartment. The carbon precursor is preferably supplied to each compartment at a flow rate which achieves uniform distribution of the carbon precursor on the activated carbon particles. For example, the carbon precursor can be supplied at a flow rate which results in a liquid drops, spray of liquid, or continuous flow of liquid onto the bed of fluidized particles. While not wishing to be bound by theory, it is believed that uniform distribution of the carbon precursor is assisted by the fluidizing gas which aids mass transfer of precursor from particle to particle as the particles travel in vertical and/or horizontal directions in the fluidized bed. A preferred outlet arrangement provides one outlet for distributing the carbon precursor over an area of 20 to 60 in$^2$, e.g., about 30 to 40 in$^2$ at the upper surface of the fluidized bed.

The carbon precursor can be applied to the fluidized particles at any desired temperature. Preferably, the bed is not heated and the particles can be at a temperature in the range of about 0 to 80° C., more preferably about 15 to 30° C. Heating of the carbon particles during the treatment is not required because adequate coating of the particles with the carbon precursor can be achieved without heating. Preferably, substantially all of the carbon precursor introduced into the vessel is coated on the carbon particles. In terms of added weight, the carbon particles can be treated to include from about 1 to 150 wt. % (dry weight) of the carbon precursor.

As mentioned above, the incipient wetness technique can be used to incorporate a solution of the pre-treatment compound and/or a solution of the carbon precursor into and/or on the activated carbon substrate. For example, activated carbon particles can be immersed in an aqueous or non-aqueous solution of a carbon precursor for a specified period of time and then dried to incorporate a coating of the precursor on an exposed surface of the particles. The period of time is preferably chosen so as to be sufficient to form a substantially uniform coating of the compound in and/or on the carbon (e.g., from about 1 to 48 hours, preferably about 12 to 24 hours). A preferred concentration of a solution comprising the pre-treatment compound is from about 1 to 25 by weight, and a preferred concentration of the carbon precursor solution is from about 20 to 60% by weight. While the activated carbon is immersed in the solvent containing the precursor solute, the precursor is absorbed and/or adsorbed in and/or on the activated carbon (e.g., onto the exposed surface of the activated carbon). The carbon precursor can be incorporated into the activated carbon substrate in a single coating step or in multiple coating steps.

After the carbon precursor solution is incorporated in and/or on the activated carbon substrate, the coated carbon is dried preferably by air-drying or by heating at a temperature of from about 80 to 120° C. After drying, the coated activated carbon is heated at a temperature sufficient to carbonize (i.e., thermally decompose) the carbon precursor and form a carbon coating.

The heating time and temperature will depend, at least in part, on the activated carbon substrate, the carbon precursor and the desired structure of the modified activated carbon. Modified activated carbon is preferably formed by heating the coated activated carbon at a temperature of less than about 400° C., more preferably less than about 300° C., for a time of less than about 2 hours, though higher temperatures and/or longer times can be used. Preferably the thermal budget (i.e., time and temperature) used to decompose the carbon precursor is sufficient to convert substantially all of the carbon precursor to carbon.

The coated activated carbon substrate can be heated in an oxidizing or inert atmosphere. An oxidizing atmosphere can comprise $O_2$, CO, air and mixtures thereof. An inert atmosphere can comprise $N_2$, Ar, He and mixtures thereof. Without wishing to be bound by theory, it is believed that heating in an oxidizing atmosphere, which causes the decomposition and oxidation of the carbon precursor, creates a larger mean surface porosity than heating in an inert atmosphere wherein the carbon precursor decomposes but does not as readily oxidize.

Figure 3A:
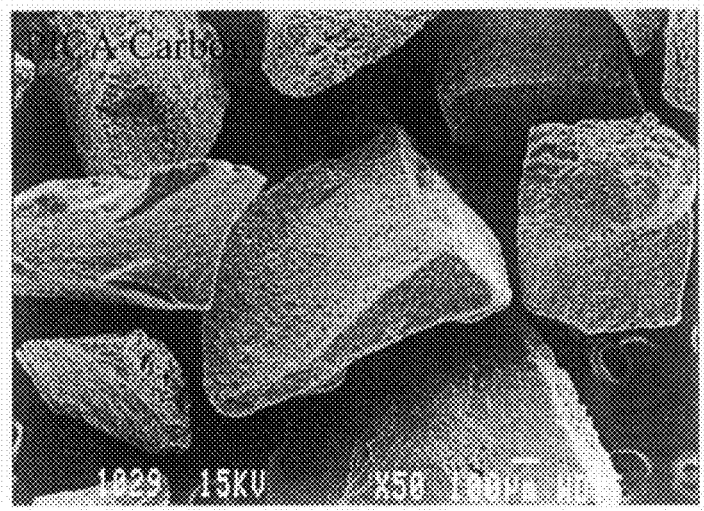
FIGS. 3A and 3B show SEM micrographs of as-received activated carbon particles.
Figure 3B:
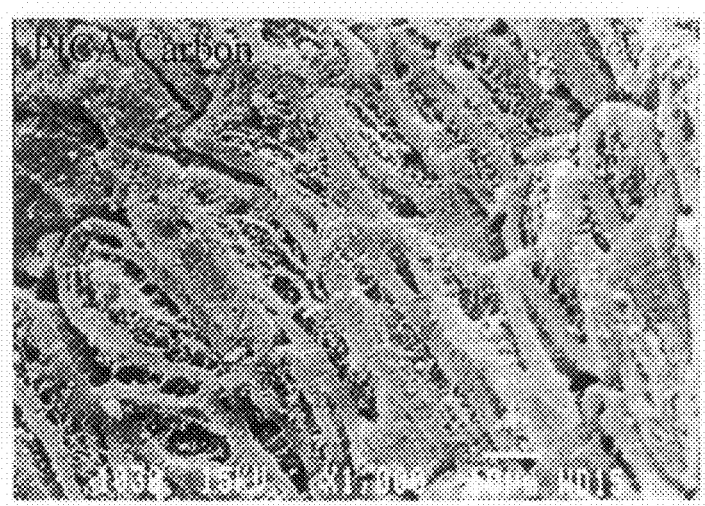
Figure 4A:
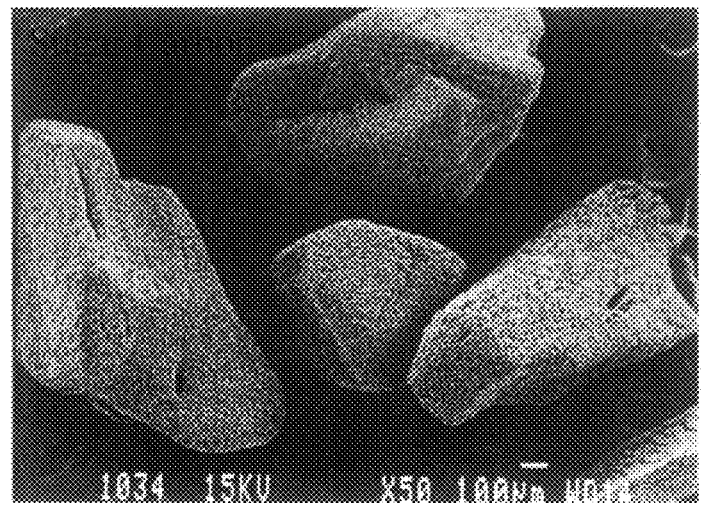
FIGS. 4A and 4B show SEM micrographs of modified activated carbon particles.
Figure 4B:
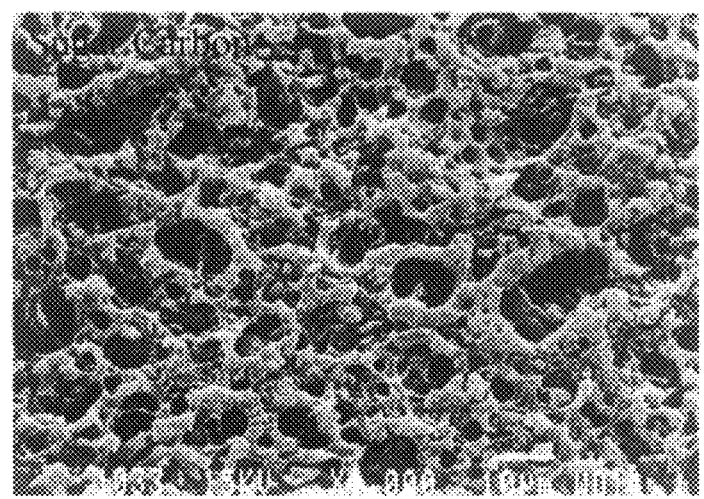

SEM micrographs of as-received activated carbon and modified activated carbon are shown in FIGS. 3 and 4, respectively. FIGS. 3A and 3B show as-received PICA carbon. To form the modified activated carbon shown in FIGS. 4A and 4B, the as-received activated carbon was initially immersed in a 10 wt. % solution of cetyltrimethylammonium chloride, air dried at room temperature and then oven dried at 100° C. for 5 hours to form a pre-treated activated carbon. The modified activated carbon was prepared by immersing 20 g of the pre-treated activated carbon with 10 g of a 67 wt. % solution of sucrose in water for 12 hours to form a coated carbon, drying the coated carbon at 100° C. for about 5 hours, and then heating the coated carbon at 300° C. for 1 hour. The surface area of the modified activated carbon after heating at 300° C. in nitrogen is about 80 m$^2$/g.

The activated carbon particles can be provided with a loading of about 1 to 150% by weight of the carbon. Without wishing to be bound by theory, it is believed that the total surface area (as measured by BET) of the modified activated carbon will be dominated by the micro-porosity of the activated carbon substrate. Because the porous carbon coating does not substantially block access to the micropores, the total surface area of the modified activated carbon is substantially equal to the total surface area of the activated carbon substrate. Preferably, the total surface area of the modified activated carbon is at least 90%, more preferably at least 95% of the total surface area of the activated carbon substrate. While the total surface area of the activated carbon is preferably not substantially reduced, the incorporation of a uniform porous carbon membrane can alter, preferably decrease, the average surface pore size of the modified activated carbon with respect to the activated carbon substrate. The absorption/adsorption characteristics of the activated carbon can be controlled by controlling the pore size distribution (e.g., average surface porosity) in the carbon coating. Furthermore, by pre-treating the activated carbon (i.e., converting a typically hydrophobic carbon surface to a substantially hydrophilic surface) a uniform coating of the carbon precursor can be formed on the activated carbon substrate. A uniform carbon membrane covers at least 80% of the exposed surface (i.e., line-of-sight external surface) of the activated carbon substrate, more preferably at least 90% of the exposed surface and/or has an average thickness having a standard deviation that is less than about 25%, more preferably less than about 10%, of the average thickness.

The application of a carbon membrane can impart mechanical robustness to the activated carbon substrate. For example, by applying a carbon membrane to the activated carbon substrate the propensity for flaking or dusting of the activated carbon substrate can be reduced. Preferably the average thickness of the carbon membrane is between about 1 micron and 0.1 mm (e.g., from about 1-5, 2-20, 5-50, 10-20, 40-60, 50-100, or 80-100 microns).

The modified activated carbon can have improved filtration characteristics relative to the activated carbon substrate. The carbon membrane can be applied in a manner which allows the modified activated carbon to reduce the content in mainstream smoke of one or more gaseous constituents such as 1,3-butadiene, acrolein, isoprene, propionaldehyde, acrylonitrile, benzene, toluene, styrene, acetaldehyde and hydrogen cyanide. Preferably, however, the modified activated carbon does not substantially reduce the concentration in mainstream smoke of flavor components of the smoke. Thus, the modified activated carbon can exhibit a decreased retentive capacity relative to the activated carbon substrate via the incorporation of a uniform porous carbon membrane that changes the absorption and/or adsorption kinetics of the activated carbon substrate. An unmodified activated carbon substrate that is incorporated into a cigarette can remove desirable flavor compounds and/or impart an undesirable carbon flavor to cigarette smoke during smoking of the cigarette. Advantageously, the uniform coating of the modified activated carbon can substantially eliminate the adverse taste associated with activated carbon.

Figure 5:
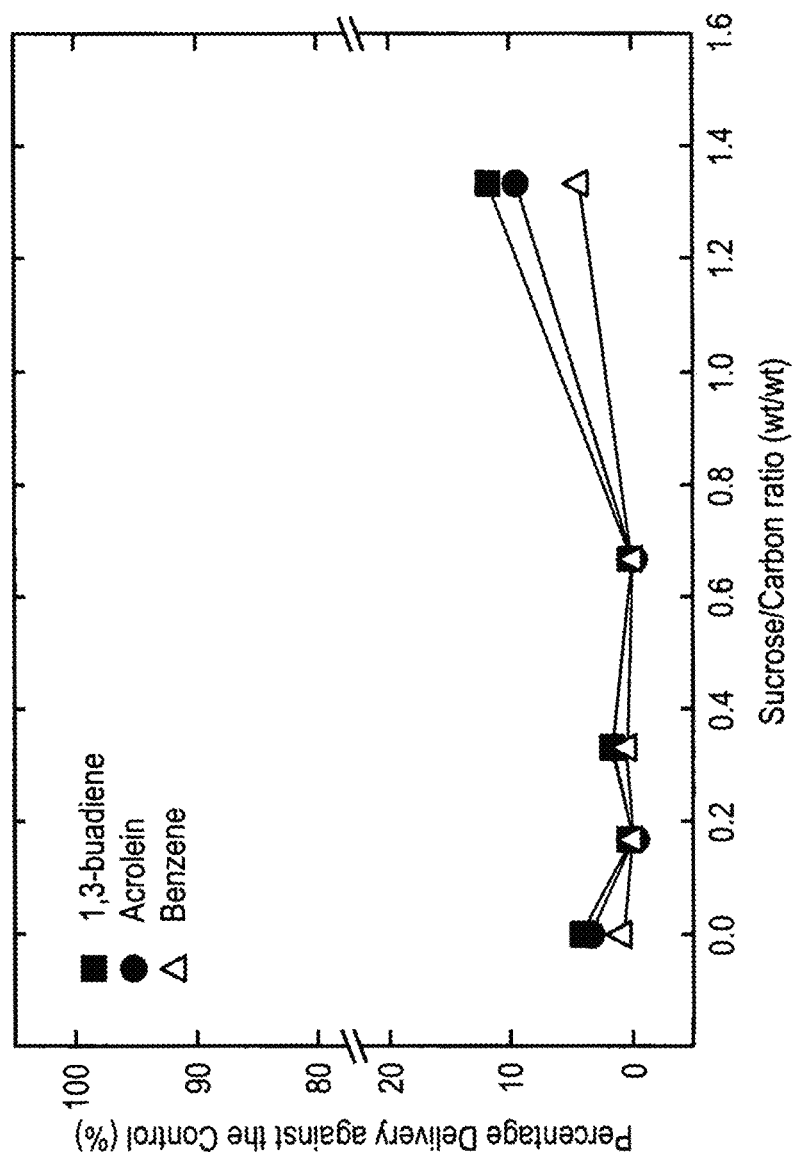
FIG. 5 is a graph of percent delivery (relative to a control) of select gas phase constituents as a function of sucrose content for modified activated carbon.

FIG. 5 shows the percentage reduction relative to a standard for three gaseous constituents (1,3-butadiene, acrolein, benzene) using as-received activated carbon (corresponding to the data at 0% sucrose) or modified activated carbon in an experimental set up. The sucrose/carbon ratio refers to the weight gain (in weight %) of the activated carbon substrate from the decomposition of a sucrose coating to form the modified activated carbon. To produce the modified activated carbon, a 10 wt. % solution of cetyltrimethyl-ammonium chloride was combined with as-received PICA activated carbon, dried in air and then dried at 100° C. for about 5 hours to form a pre-treated activated carbon. Approximately 20 g of the pre-treated activated carbon was combined with 10 g of a 67 wt. % aqueous solution of sucrose via the incipient wetness technique. After a 12 hour exposure, the mixture was dried at 100° C. for 5 hours and then heated at 300° C. for 1 hour to form the modified activated carbon. By re-immersing the modified activated carbon in the sucrose solution, the loading of carbon on the activated carbon substrate (expressed wt. %/wt. %) was increased.

Referring still to FIG. 5, the percent reduction of 1,3-butadiene, acrolein and benzene improved for carbon coating additions up to about 65%. A carbon coating corresponding to a weight gain of about 135%, however, resulted in a decreased filtration efficiency for 1,3-butadiene, acrolein and benzene.

The modified activated carbon may be used in a variety of applications, including cigarettes, cut filler compositions and cigarette filters. In a cigarette comprising the modified activated carbon, the modified activated carbon particles may be located in the filter and/or dispersed in the cut filler. A typical cigarette will include from about 10 mg to about 200 mg of the modified activated carbon particles, although the amount needed can also be determined by routine experimentation and/or adjusted accordingly. The modified activated carbon can be used to selectively adsorb/filter specific constituents from the mainstream smoke of a cigarette.

Examples of suitable types of tobacco materials which may be used include flue-cured, Burley, Bright, Maryland or Oriental tobaccos, the rare or specialty tobaccos, and blends thereof. The tobacco material can be provided in the form of tobacco lamina; processed tobacco materials such as volume expanded or puffed tobacco, processed tobacco stems such as cut-rolled or cut-puffed stems, reconstituted tobacco materials; or blends thereof. Tobacco substitutes may be used.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to 3.0 inches. The cigarettes may further comprise one or more flavorants or other additives (e.g., burn additives, combustion modifying agents, coloring agents, binders, etc.).

Techniques for cigarette manufacture are known in the art, and may be used to incorporate the modified activated carbon. The resulting cigarettes can be manufactured to any desired specification using standard or modified cigarette making techniques and equipment. The cigarettes may range from about 50 mm to 120 mm in length. The circumference is from about 15 mm to 30 mm in circumference, and preferably around 25 mm. The packing density is typically between the range of about 100 mg/cm$^3$ to 300 mg/cm$^3$, and preferably about 150 mg/cm$^3$ to 275 mg/cm$^3$.

Any conventional or modified cigarette filter may incorporate the modified activated carbon particles. The modified activated carbon can incorporated into or onto a support such as paper (e.g., liner, plug wrap or tipping paper) that is located along a filter portion of a cigarette. The modified activated carbon can also be loaded onto a support such as lightly or tightly folded paper inserted into a hollow portion of the cigarette filter. The support is preferably in the form of a sheet material such as crepe paper, filter paper, or tipping paper. However, other suitable support materials such as organic or inorganic cigarette compatible materials can also be used.

Figure 6:
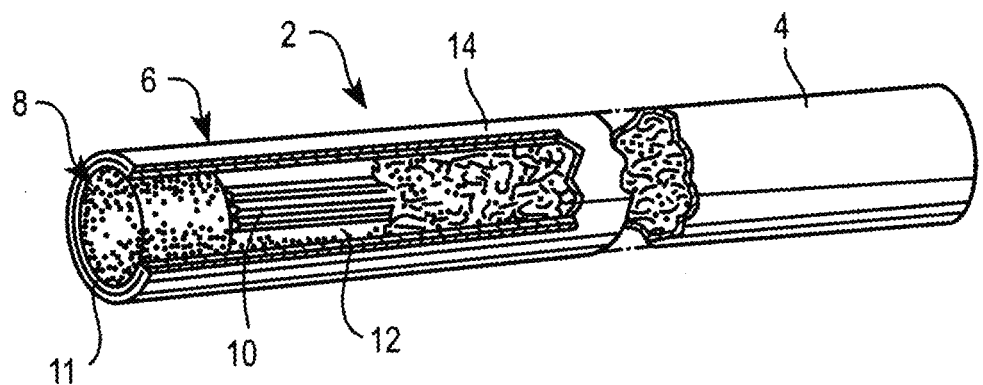
FIG. 6 is a partially exploded perspective view of a cigarette wherein folded paper containing the modified activated carbon is inserted into a hollow portion of a tubular filter element of the cigarette.

FIG. 6 illustrates a cigarette 2 having a tobacco rod 4, a filter portion 6, and a mouthpiece filter plug 8. Modified activated carbon particles can be loaded onto folded paper 10 inserted into a hollow cavity such as the interior of a free-flow sleeve 12 forming part of the filter portion 6. The paper 10 can be used in forms other than as a folded sheet. For instance, the paper 10 can be deployed as one or more individual strips, a wound roll, etc. In whichever form, a desired amount of modified activated carbon particles can be provided in the cigarette filter portion by adjusting the amount of modified activated carbon coated per unit area of the paper and/or the total area of coated paper employed in the filter (e.g., higher amounts of surface-modified adsorbent can be provided simply by using larger pieces of coated paper). In the cigarette shown in FIG. 6, the filter portion 6 may be held together by filter overwrap 11, and the tobacco rod 4 and the filter portion 6 can be joined together with tipping paper 14.

The modified activated carbon can be incorporated into the filter paper in a number of ways. For example, the modified activated carbon can be mixed with water to form a slurry. The slurry can then be coated onto pre-formed filter paper and allowed to dry. The filter paper can then be incorporated into the filter portion of a cigarette in the manner shown in FIG. 6. Alternatively, dried paper comprising the modified activated carbon can be wrapped into a plug shape and inserted into a filter portion of the cigarette. For example, the paper can be wrapped into a plug shape and inserted as a plug into the interior of a free-flow filter element such as a polypropylene or cellulose acetate sleeve. In another arrangement, the paper can comprise an inner liner of such a free-flow filter element.

The modified activated carbon can be added to filter paper during the paper-making process. For example, the modified activated carbon can be mixed with bulk cellulose to form a cellulose pulp mixture. The mixture can be then formed into filter paper.

The modified activated carbon can incorporated in a hollow portion of a cigarette filter. For example, some cigarette filters have a plug/space/plug configuration in which the plugs comprise a fibrous filter material (e.g., polypropylene or cellulose acetate fibers) and the space is simply a void between the two filter plugs. That void can be filled with the modified activated carbon. The modified activated carbon can be used in granular form or loaded onto a suitable support such as a fiber or thread (e.g., the modified activated carbon can be incorporate in a plug of cellulose acetate tow material).

Figure 7:
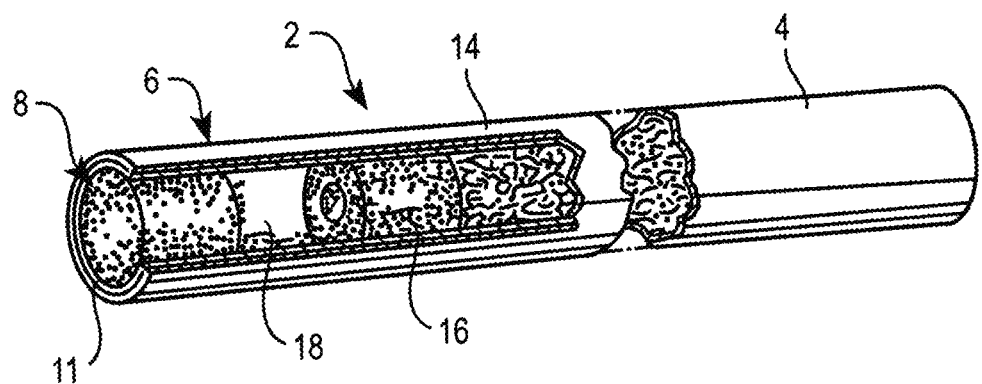
FIG. 7 is a partially exploded perspective view of a cigarette wherein the modified activated carbon is incorporated in a plug-space-plug filter element.

FIG. 7 shows a cigarette 2 comprised of a tobacco rod 4 and a filter portion 6 in the form of a plug-space-plug filter having a mouthpiece filter 8, a plug 16, and a space 18. The plug can comprise a tube or solid piece of material such as polypropylene or cellulose acetate fibers. The tobacco rod 4 and the filter portion 6 are joined together with tipping paper 14. The filter portion 6 may include a filter overwrap 11. Modified activated carbon particles can be incorporated in and/or on the filter overwrap 11 such as by being coated thereon. Alternatively, the modified activated carbon particles can be incorporated in the mouthpiece filter 8, in the plug 16 and/or in the space 18. Moreover, the modified activated carbon can be incorporated in any element of the filter portion of a cigarette.

Figure 8:
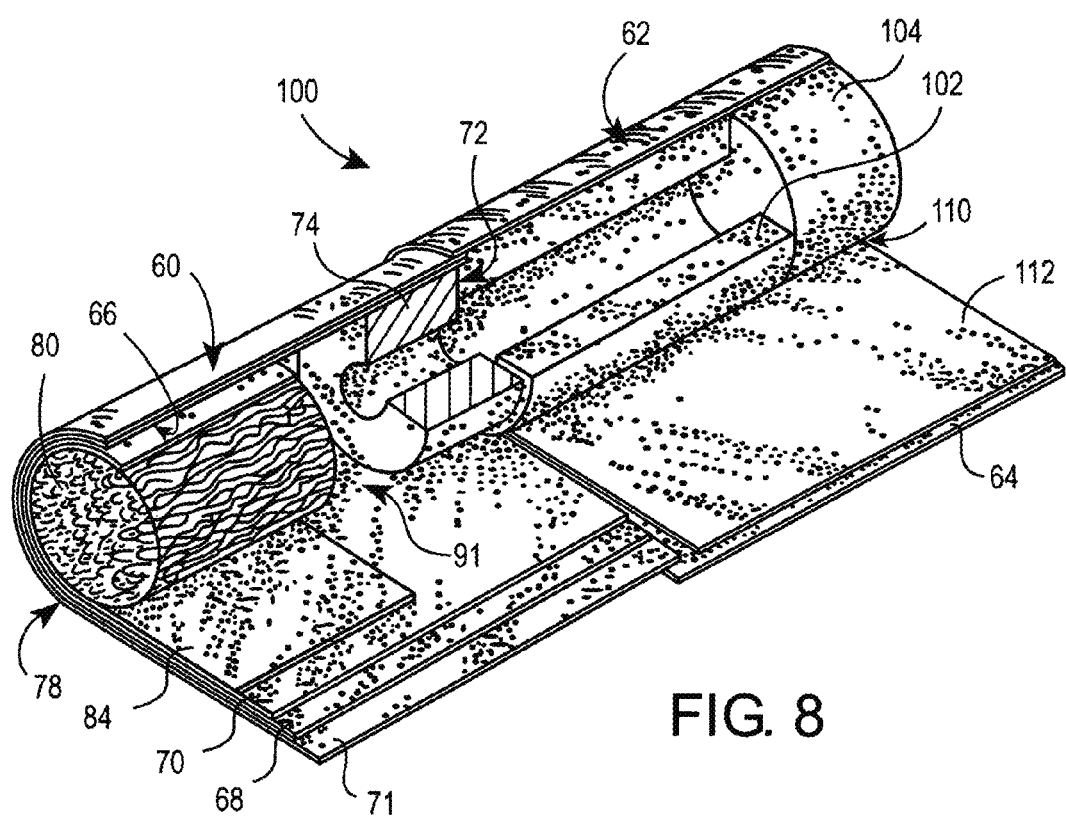
FIG. 8 is a partially exploded perspective view of a filter element having modified activated carbon incorporated therein, which may be used to form a cigarette that can be smoked in an electrically-heated cigarette smoking system.

In another embodiment, the modified activated carbon is employed in a filter portion of a cigarette for use with a smoking device as described in U.S. Pat. No. 5,692,525, the entire content of which is hereby incorporated by reference. FIG. 8 illustrates one type of construction of a cigarette 100 which can be used with an electrical smoking device. As shown, the cigarette 100 includes a tobacco rod 60 and a filter portion 62 joined by tipping paper 64. The filter portion 62 preferably contains a tubular free-flow filter element 102 and a mouthpiece filter plug 104. The free-flow filter element 102 and mouthpiece filter plug 104 may be joined together as a combined plug 110 with plug wrap 112. The tobacco rod 60 can have various forms incorporating one or more of the following items: an overwrap 71, another tubular free-flow filter element 74, a cylindrical tobacco plug 80 preferably wrapped in a plug wrap 84, a tobacco web 66 comprising a base web 68 and tobacco flavor material 70, and a void space 91. The free-flow filter element 74 provides structural definition and support at the tipped end 72 of the tobacco rod 60. At the free end 78 of the tobacco rod 60, the tobacco web 66 together with overwrap 71 are wrapped about cylindrical tobacco plug 80. Various modifications can be made to a filter arrangement for such a cigarette incorporating the modified activated carbon.

In such a cigarette, the modified activated carbon can be incorporated in various ways such as by being loaded onto paper or other substrate material that is fitted into the passageway of the tubular free-flow filter element 102 therein. The modified activated carbon may also be deployed as a liner or a plug in the interior of the tubular free-flow filter element 102. Alternatively, or in addition, the modified activated carbon can be incorporated into the fibrous wall portions of the tubular free-flow filter element 102 itself. For instance, the tubular free-flow filter element or sleeve 102 can be made of suitable materials such as polypropylene or cellulose acetate fibers and the modified activated carbon can be mixed with such fibers prior to or as part of the sleeve forming process.

The modified activated carbon can be incorporated into the mouthpiece filter plug 104 instead of in the element 102. However, as in the previously described embodiments, the modified activated carbon may be incorporated into more than one component of a filter portion such as by being incorporated into the mouthpiece filter plug 104 and into the tubular free-flow filter element 102. The filter portion 62 of FIG. 8 can be modified to create a void space into which the modified activated carbon particles can be inserted.

As explained above, the modified activated carbon can be incorporated in various support materials. When the modified activated carbon particles are used in filter paper, the particles may have an average particle size of 10 to 100 microns, preferably 30 to 80 microns. When the surface-modified adsorbent is used in filter fibers or other mechanical supports, larger particles may be used. Such particles preferably have a mesh size from 10 to 70, and more preferably from 20 to 50 mesh.

The amount of modified activated carbon employed in the cigarette filter by way of incorporation on a suitable support such as filter paper and/or filter fibers depends on the amount of constituents in the tobacco smoke and the amount of constituents desired to be removed. As an example, the filter paper and the filter fibers may contain from 10% to 50% by weight of the modified activated carbon particles.

While preferred embodiments have been described, it is to be understood that variations and modifications may be resorted to as will be apparent to those skilled in the art. Such variations and modifications are to be considered within the purview and scope of the claims appended hereto.

All of the above-mentioned references are herein incorporated by reference in their entirety to the same extent as if each individual reference was specifically and individually indicated to be incorporated herein by reference in its entirety.

What is claimed is:

1. A process for making modified activated carbon, said modified activated carbon comprising an activated carbon substrate and a uniform porous carbon membrane formed on an exposed surface of the activated carbon substrate, the process comprising:
   (i) providing an activated carbon substrate;
   (ii) pre-treating the activated carbon substrate to make an exposed surface of the activated carbon substrate substantially hydrophilic;
   (iii) coating the pre-treated activated carbon substrate with a carbon precursor to form a coated activated carbon substrate; and
   (iv) heating the coated activated carbon substrate in an oxidizing atmosphere and at a temperature of from about 150° C. to 400° C. to carbonize the carbon precursor to form the uniform porous carbon membrane,
   wherein the carbon membrane has an average thickness having a standard deviation that is less than about 25% of the average thickness and the carbon membrane has an average thickness ranging from about 1 micron to 0.1 mm.

2. The process of claim 1, wherein the activated carbon substrate is a substrate selected from the group consisting of beads, granules and fibers and/or the activated carbon substrate has an average particle size of from about 100 microns to 5 mm or from about 200 microns to 2 mm.

3. The process of claim 1, wherein the activated carbon substrate has an average pore size of less than about 500 Angstroms, the activated carbon substrate has a pore size distribution comprising greater than about 20% micropores and fewer than about 80% mesopores and/or the activated carbon substrate has an average surface area of greater than 50 $m^2/g$ or greater than 200 $m^2/g$.

4. The process of claim 1, wherein the pre-treating comprises spraying the activated carbon substrate with and/or immersing the activated carbon substrate in a solution comprising from about 1 to 99 wt. % surfactant wherein the surfactant optionally comprises cetyltrimethylammonium chloride and/or the solution optionally comprises from about 1 to 25 wt. % surfactant.

5. The process according to claim 1, further comprising drying the activated carbon substrate at a temperature of less than about 120° C. prior to coating and/or further comprising drying the coated activated carbon substrate at a temperature of less than about 120° C. prior to carbonizing.

6. The process according to claim 1, wherein the coating comprises spraying the activated carbon substrate with and/or immersing the activated carbon substrate in a solution comprising the carbon precursor, the solution optionally comprising from about 1 to 99 wt. % carbon precursor or from about 20 to 60 wt. % carbon precursor.

7. The process according to claim 1, wherein the carbon precursor is selected from the group consisting of saccharides, disaccharides, polysaccharides, fructose and ethyl cellulose.

8. The process of claim 1, wherein the coating is carried out to provide from about 1 to 150% by weight of the carbon precursor in and/or on the activated carbon substrate or the coating is carried out to provide from about 20 to 80% by weight of the carbon precursor in and/or on the activated carbon substrate.

9. The process of claim 1, wherein the coating is carried out without heating the activated carbon substrate or the coated activated carbon substrate is carbonized at a temperature of from about 150° C. to 400° C. to form the carbon membrane.

10. The process of claim 1, wherein the modified activated carbon has an average surface pore size that is at least 10% less than or at least 25% less than the average surface pore size of the activated carbon substrate and/or the modified activated carbon has an average surface area of at least 50 $m^2/g$ or at least 200 $m^2/g$.

11. The process of claim 1, wherein the carbon membrane covers at least 80% of the exposed surface of the activated carbon substrate.

12. The process of claim 1, wherein the modified activated carbon has an average surface pore size that is at least 10% less than the average surface pore size of the activated carbon substrate.

13. The process of claim 1, wherein the pre-treating comprises spraying the activated carbon substrate with a solution comprising from about 1 to 25 wt. % cetyltrimethylammonium chloride.

14. The process according to claim 1, further comprising drying the coated activated carbon substrate at a temperature of less than about 120° C. prior to carbonizing.

15. The process according to claim 1, wherein the coating comprises spraying the activated carbon substrate with a solution comprising the carbon precursor, the solution comprising about 20 to 60 wt. % carbon precursor.

16. The process according to claim 1, wherein the pre-treating consists of treating the activated carbon substrate with a solution or emulsion consisting of a surfactant and a solvent.

* * * * *